US009796491B2

(12) United States Patent
Graffin

(10) Patent No.: US 9,796,491 B2
(45) Date of Patent: Oct. 24, 2017

(54) METHOD AND APPARATUS FOR WEIGHT FILLING CONTAINER ON A CONVEYOR

(71) Applicant: Serac group, La Ferte Bernard (FR)

(72) Inventor: Andre Graffin, Winfield, IL (US)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 14/527,306

(22) Filed: Oct. 29, 2014

(65) Prior Publication Data

US 2015/0114514 A1     Apr. 30, 2015

(30) Foreign Application Priority Data

Oct. 30, 2013   (FR) ...................................... 13 60628

(51) Int. Cl.
| | |
|---|---|
| *B65B 3/28* | (2006.01) |
| *G01G 13/02* | (2006.01) |
| *B65B 43/59* | (2006.01) |
| *B67C 3/20* | (2006.01) |

(52) U.S. Cl.
CPC ................ *B65B 3/28* (2013.01); *B65B 43/59* (2013.01); *B67C 3/202* (2013.01); *G01G 13/02* (2013.01)

(58) Field of Classification Search
CPC ........... B65B 3/28; B65B 43/59; B67C 3/202; G01G 13/02

USPC ........ 141/163, 164, 165, 166, 269, 270, 279
See application file for complete search history.

(56) References Cited

U.S. PATENT DOCUMENTS

| | | | |
|---|---|---|---|
| 5,400,837 A | 3/1995 | Kelley et al. | |
| 7,173,196 B2* | 2/2007 | Gruson | .............. G01G 13/2851 141/83 |
| 2012/0060973 A1* | 3/2012 | Jaeger | ..................... B67C 3/202 141/83 |

FOREIGN PATENT DOCUMENTS

| | | |
|---|---|---|
| DE | 10 2009 011 949 B3 | 7/2010 |
| EP | 2 433 900 A1 | 3/2012 |

* cited by examiner

*Primary Examiner* — Timothy L Maust
*Assistant Examiner* — Andrew Schmid
(74) *Attorney, Agent, or Firm* — Muncy, Geissler, Olds & Lowe, P.C.

(57) ABSTRACT

A method of filling by weight containers having respective bottoms standing on a conveyor, including the steps of: grasping each container in order to separate it from the conveyor and to bring it up to a substance dispenser spout; weighing the container while it is held separated from the conveyor under the dispenser spout and while simultaneously filling it in order to reach a desired weight; and putting the container back onto the conveyor. In addition, an installation for performing the above method is provided.

8 Claims, 7 Drawing Sheets

METHOD AND APPARATUS FOR WEIGHT FILLING CONTAINER ON A CONVEYOR

The present invention relates to a method and an installation for filling containers by weight.

Container-processing installations are known that comprise, for example: a container decontamination station; a container filler station; and a container closure station. The containers are conveyed from station to station by a conveyor on which the containers stand via their bottoms. The conveyors in most widespread use are belt conveyors, because of their simplicity in use.

A filler station generally comprises substance dispenser spouts controlled by a substance-metering device that is arranged to interrupt the dispensing of substance when the container has been filled with the desired quantity of substance. The dispenser spouts and the metering devices are generally mounted on a transporter so as to be moved together with the containers while they are being filled.

There exist both volume-metering devices and weight-metering devices. Volume-metering devices are the most commonly used for filling containers that are supported by a conveyor since they do not require action to be taken on the containers.

In contrast, weight-metering devices operate by weighing the containers while they are being filled. It is then necessary to provide branch connection means in order to take the containers off the conveyor and onto scales that are arranged under the dispenser spouts in such a manner that the conveyors stand via their bottoms on the scales while they are being filled. That complicates the structure of the installation.

An object of the invention is to provide means for facilitating weight filling of containers standing on a conveyor.

For this purpose, the invention provides a method of weight filling containers having respective bottoms standing on a conveyor. The method comprises the steps of:
grasping each container in order to separate it from the conveyor while under a substance dispenser spout;
weighing the container while it is held separated from the conveyor under the dispenser spout and while simultaneously filling it in order to reach a desired weight; and
putting the container back onto the conveyor.

The invention also provides a filler installation for performing the method. The installation comprises a linearly-movable conveyor on which the containers are to stand via their bottoms, and a support extending at least in part over the conveyor, the support carrying at least one vertically-extending dispenser spout and a weighing device having suspended therefrom a vertical guide extending in the vicinity of the dispenser spout, a container grasper member being mounted on the support to present an opening of a container under the dispenser spout and to be movable between a low position in which the grasper member can grasp a container standing on the conveyor or can put a grasped container back onto the conveyor, and a high position in which the container is separated from the conveyor and its opening is close to the dispenser spout, and means for controlling the grasper member to move between its two positions.

Other characteristics and advantages of the invention appear on reading the following description of a particular, nonlimiting embodiment of the invention.

Reference is made to the accompanying drawings, in which.

Figure 1:
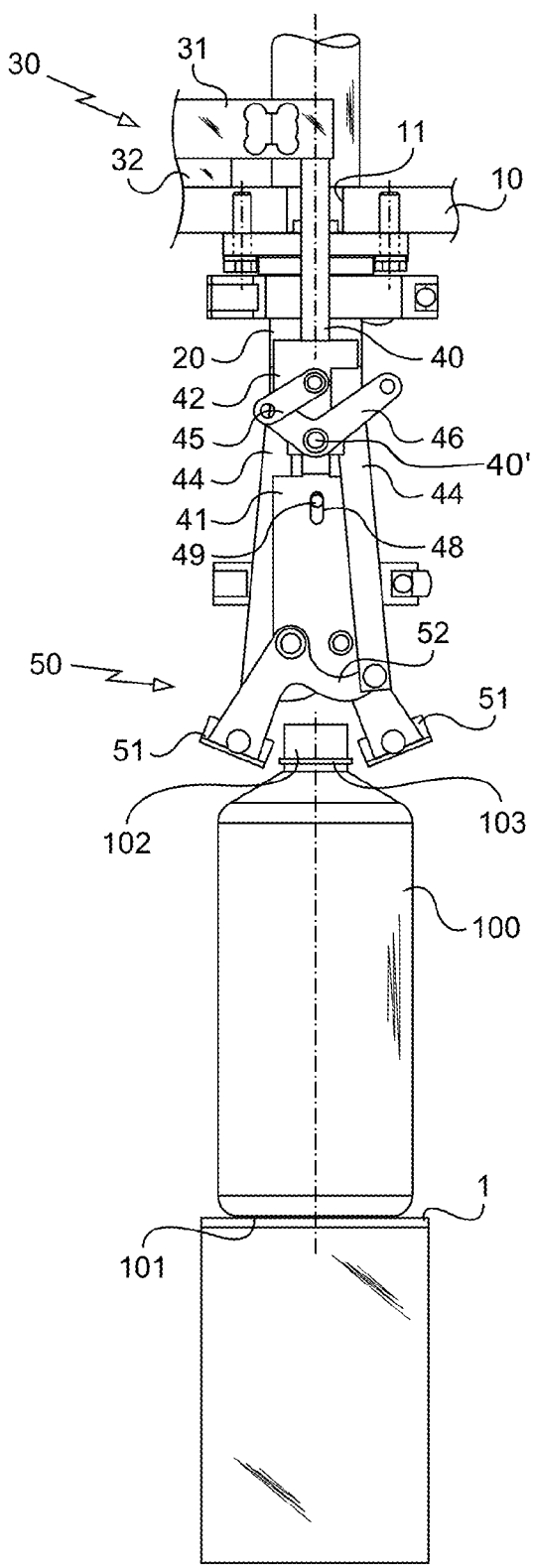
FIG. 1 is a front view in cross section of the installation of the invention, before grasping a container.

With reference to the figures, the invention relates to a method of weight filling containers 100 each having a substantially tubular body possessing a closed end comprising a bottom 101, and an opposite end that is shaped to form a neck 102 provided with a collar 103. The containers 100 stand via their bottoms 101 on a conveyor. The term "conveyor" is used to mean a linear transporter, e.g. comprising a belt, a strip, or mat extending in a travel direction of the containers and driven with running movement along this direction to move the containers in said direction.

The method of the invention comprises the steps of:
grasping each container 100 in order to separate it from the conveyor while under a substance dispenser spout;
weighing the container while it is held separated from the conveyor under the dispenser spout and while simultaneously filling it in order to reach a desired weight;
putting the container back onto the conveyor.

The method is performed by means of a container filler installation comprising a conveyor 1 that is linearly movable and on which the containers 100 are to stand via their bottoms 101. In this example, the conveyor is a linear transporter comprising a chain in which each link has a flat top surface suitable for supporting the bottom 101 of a container 100. In conventional manner, the chain is wound around at least two horizontal-axis pulleys, one of which is connected to a rotary drive motor that is in turn connected to an installation control unit. This control unit is itself known and it is not shown in the figures.

A support 10 extends at least in part over the conveyor 1. In this example, the support 10 is stationary. The support 10 carries vertically-extending dispenser spouts 20 and weighing devices that are given overall reference 30. The dispenser spouts 20 extend over the conveyor 1 at a distance from its top surface that is greater than the sum of the height of a container 100 plus a lifting height.

The dispenser spouts 20 are of a conventional structure and they are not described in detail herein. They are connected to a circuit for feeding the dispenser spouts 20 with filling substance.

In conventional manner, each weighing device 30 comprises a deformable bar 31 having a first end fastened to a stud 32 secured to the support 10 and a second end cantilevered out over an opening 11 formed through the support 10. The deformable bar 31 is provided with a strain gauge (not visible in the figures) that is connected to a control unit that is in turn connected to means for actuating a valve of the dispenser spout 20. The control unit is arranged to open the valve in order to begin dispensing substance, and thus begin filling a container, and to close the valve when the weight of the substance contained in the container 100 has reached a predetermined value. The actuator means may comprise a jack, e.g. pneumatic jack, or a solenoid of an electromagnetic actuator associated with the valve.

Each weighing device 30 is associated with a vertical column 40 that extends parallel to the corresponding dispenser spout 20, and in its vicinity. Each column 40 has a top end fastened to the second end of the deformable bar 31 by passing through the opening 11 so that the column 40 is suspended from the second end of the deformable bar 31. The column 40 forms a vertical guide along which a grasper member 50 is mounted to present the opening of a container 100 vertically under the dispenser spout 20 and to be movable between a low position in which the grasper member 50 can grasp a container 100 standing on the conveyor 1 or can put a grasped container 100 back onto the conveyor 1, and a high position in which the grasped container 100 is separated from the conveyor 1 and has its opening close to the dispenser spout 20.

The grasper member 50 is secured to a first slider 41 mounted to slide along the column 40 between a bottom abutment 43 fastened to the free bottom end of the column 40 in order to define the low position of the grasper member 50, and a position corresponding to the high position of the grasper member 50. The high position is spaced apart from the low position by a distance equal to the lifting height. The first slider 41 is held on the column 40 and is prevented from turning relative to the column 40 by a pin 48 that projects from the column 40 and that is received in an elongate groove 49 formed in the first slider 41. The groove 49 extends parallel to the column 41 and is of a length equal to the lifting height. The first slider 41 is provided with a spring 47 forming a return member for urging the first slider 41 to press against the bottom abutment 43.

The first slider 41 is connected to a second slider 42 by links 44.

The installation includes control means for each grasper member 50. The control means comprise a toggle 45 having a first end hinged to the second slider 42 and a second end hinged to a stationary point 40' extending between the sliders 41 and 42 in such a manner that the toggle 45 is folded when the grasper member 50 is in the low position, and is extended when the grasper member 50 is in the high position. When the toggle 45 is folded, the toggle 45 has a central hinge that extends on one side of an axis passing via the hinges at its ends, and when the toggle 45 is extended, the central hinge of the toggle 45 is on the other side of this axis and in abutment against one of the links 44, thereby locking the toggle 45. The second end of the toggle 45 is extended by a control lever 46 for controlling the toggle 45. The lever 46 has a free end arranged to cooperate with vertical play with an actuator 60 fastened on the support 10. In this example, the actuator 60 is a linear electromagnetic actuator having a telescopic rod 61 movable between a retracted position in which the lever 46 is raised and the toggle 45 is folded, and an extended position in which the lever 46 is lowered and the toggle 45 is extended. The free end of the telescopic rod 61 is provided with a hook 62 engaged around a lug 63 of the lever 46 in such a manner as to leave vertical play between the lug 63 and the hook 62.

The grasper member 50 comprises two jaws 51 mounted on the first slider 41 to be movable between an open position and a closed position. The end of each link 44 connected to the first slider 41 is hinged to an actuator lever 52 secured to one of the jaws 51.

Figure 2:
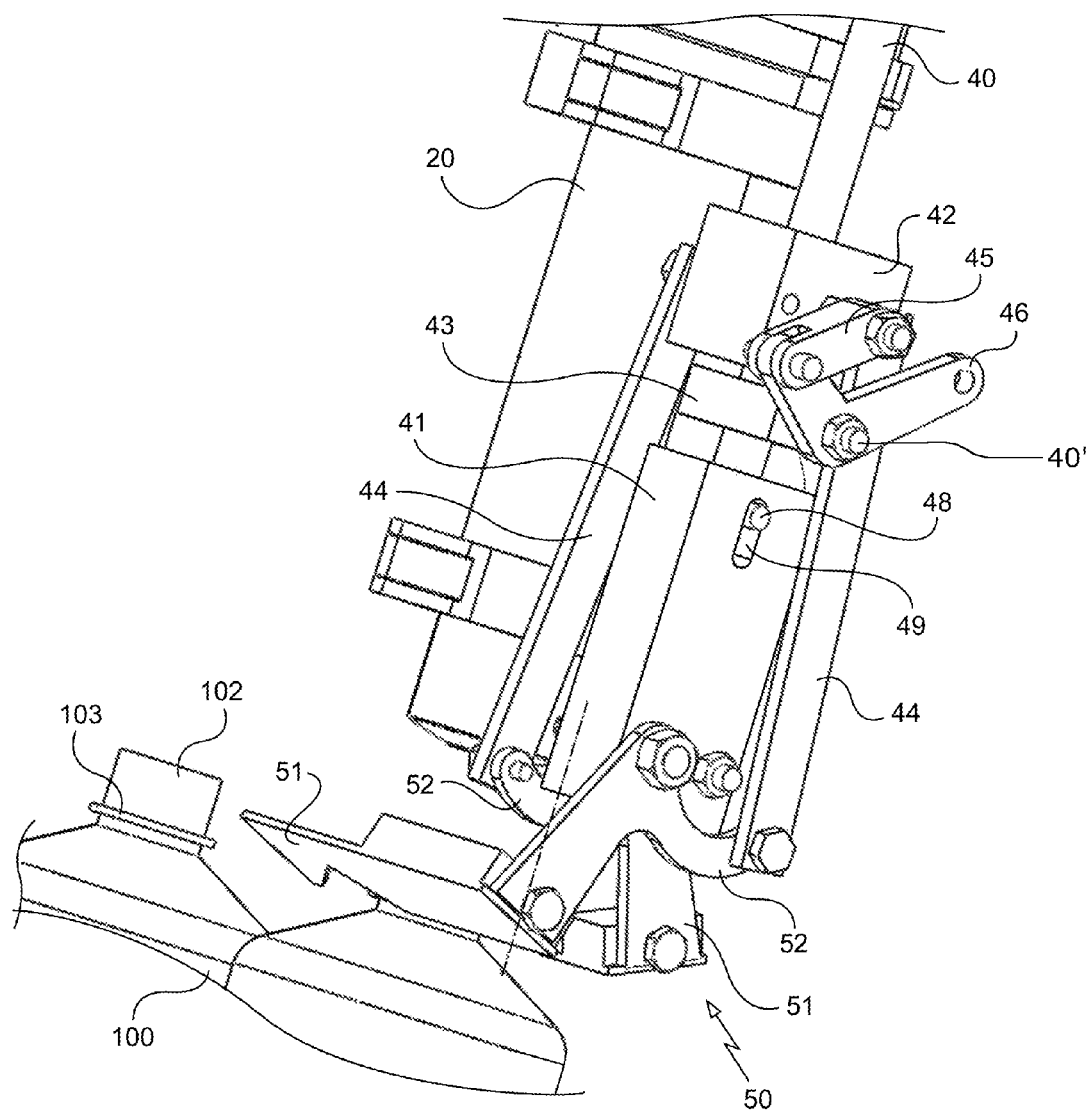
FIG. 2 is a fragmentary view in perspective of the installation.

In operation, the conveyor 1 is set into motion to bring the containers under the support 10. The open grasper members 50 are brought into the low position in such a manner that the jaws 51 extend in the vicinity of the collars 103 (see FIGS. 1 and 2).

The telescopic rod 61 of the actuator 60 is then caused to be extended in order to lower the lever 46 and deploy the toggle 45.

Deploying the toggle causes the second slider 42 to move upwards and thus applies traction to the links 44, which pull the levers 52 upwards.

Figure 3:
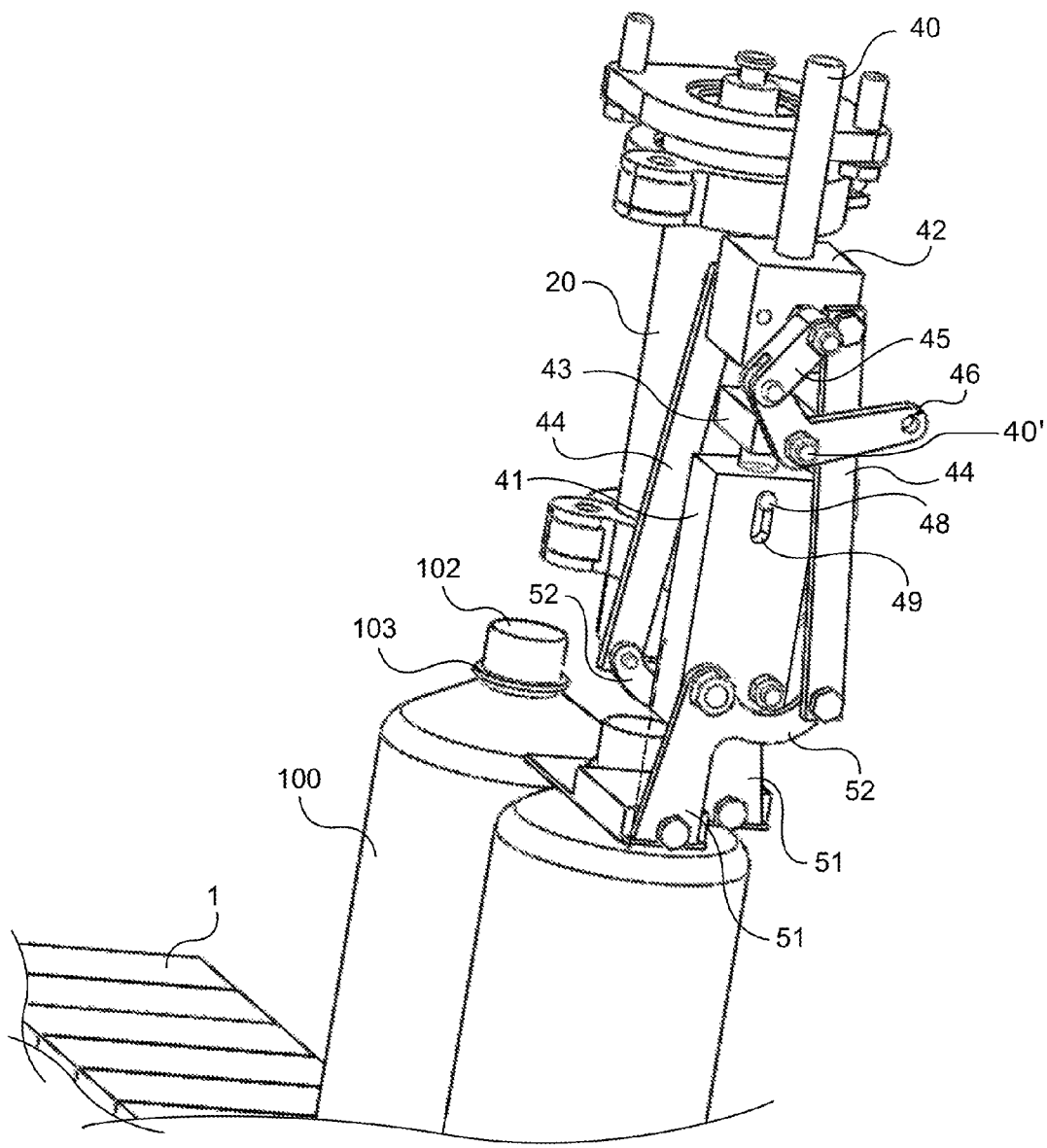
FIG. 3 is a view analogous to FIG. 2, after a container has been grasped, but before it has been lifted.

During a first portion of this movement, the first slider remains pressed by the spring 47 against the bottom abutment: the traction from the links 44 on the levers 52 causes the jaws 51 to close so as to come into position under the collar 103 (see FIG. 3).

During the second portion of this movement of the second slider 42, since the jaws 52 are in abutment in the closed position against the next 102, the traction from the links 44 on the levers 52 causes the first slider 41 to move upwards against the force exerted by the spring 47. The grasper member 50 is then taken from its low position towards its high position, thereby lifting the container 100, which becomes separated from the conveyor 1 by a height equal to the lifting height.

Figure 4:
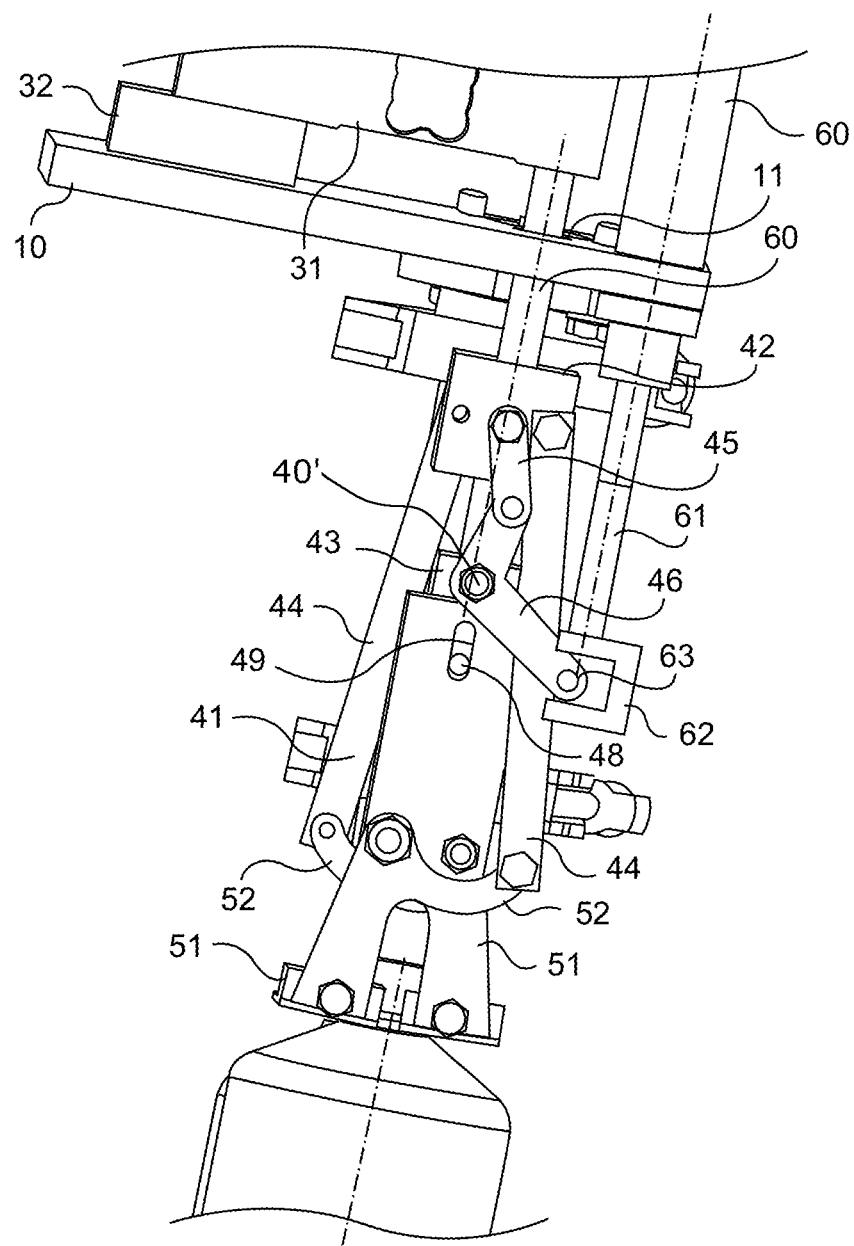
FIG. 4 is a fragmentary front view of the installation, after a container has been lifted.
Figure 5:
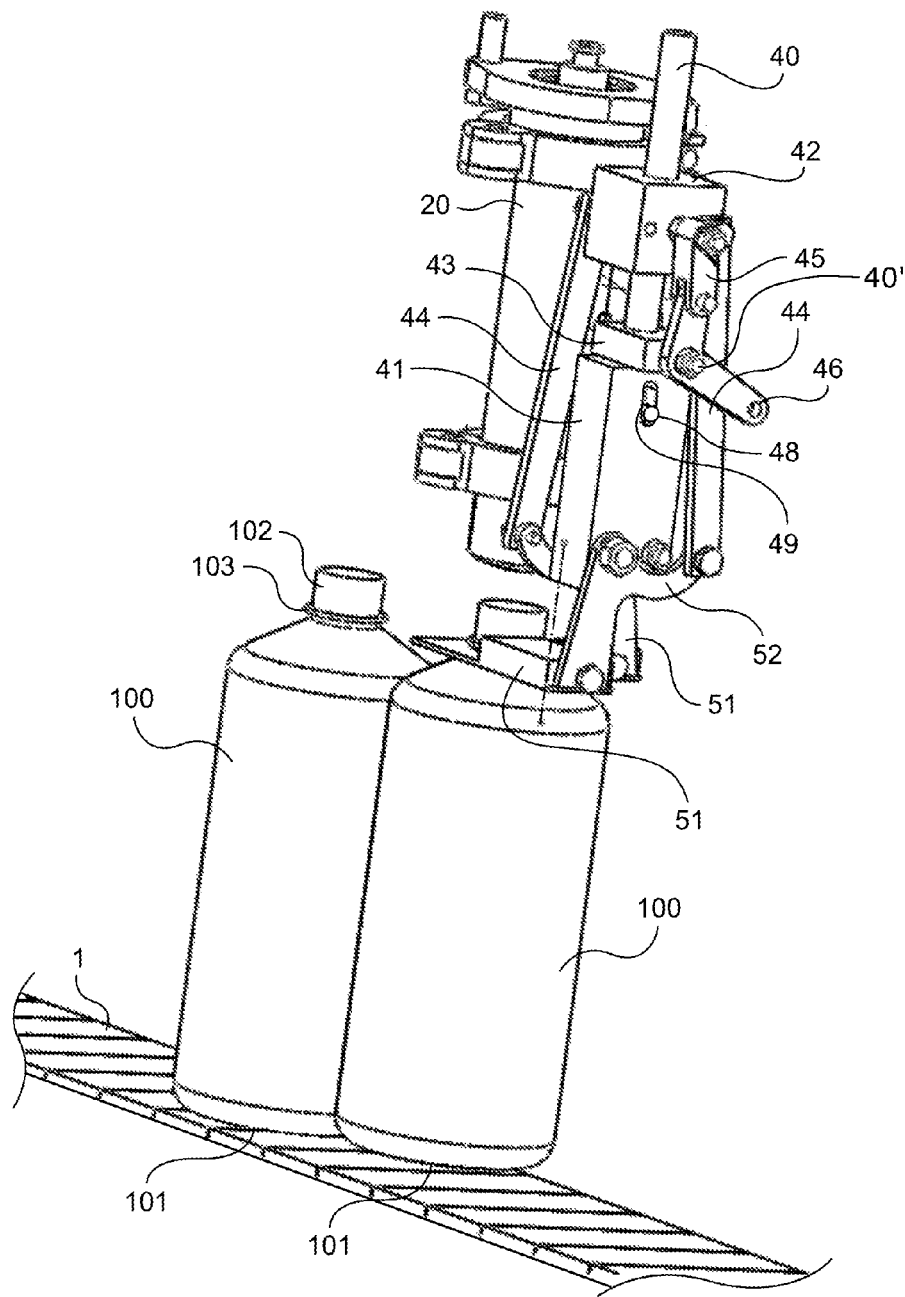
FIG. 5 is a fragmentary view in perspective of the installation, after the container has been lifted.
Figure 6:
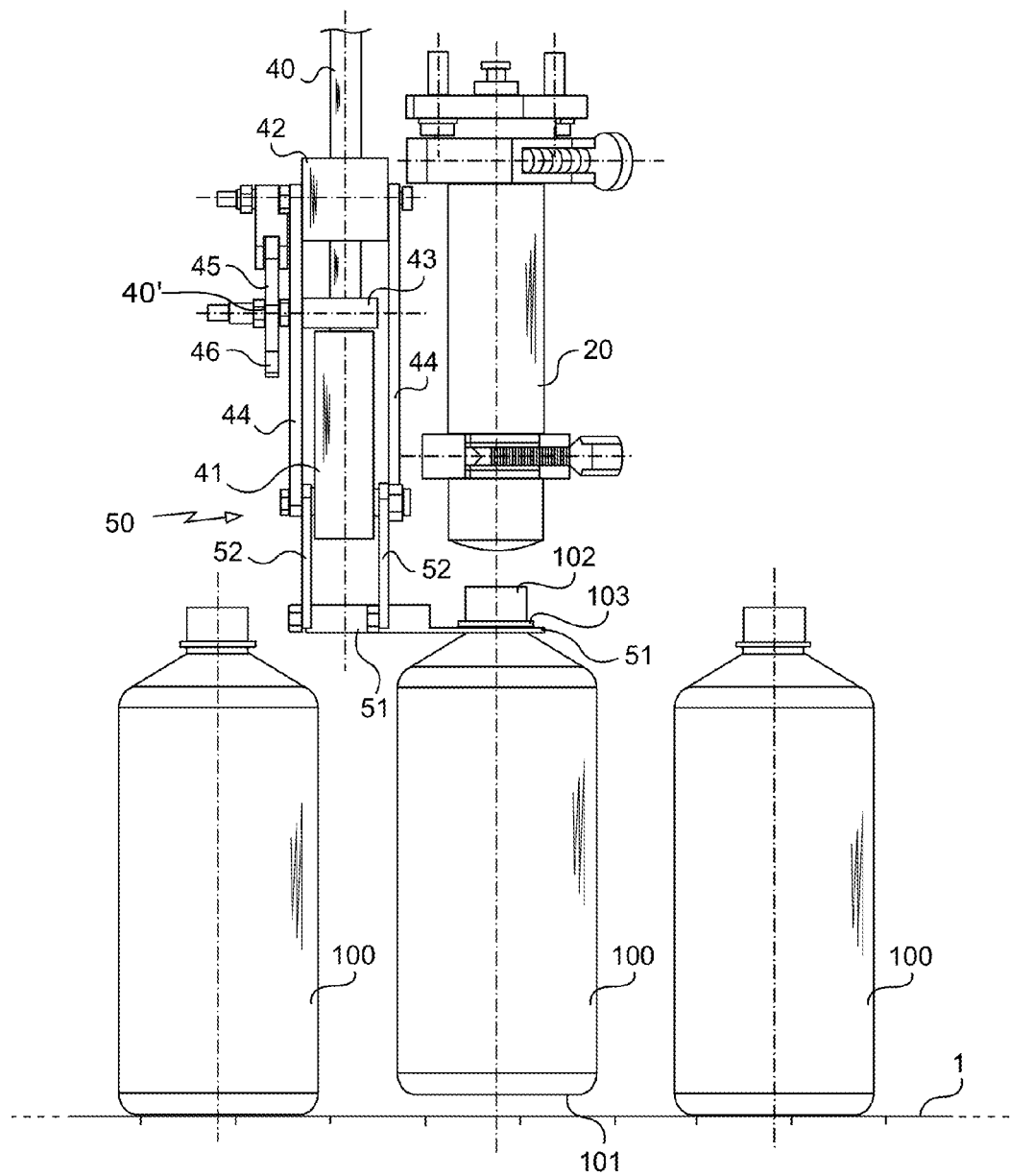
FIG. 6 is a fragmentary side view of the installation, after the container has been lifted.
Figure 7:
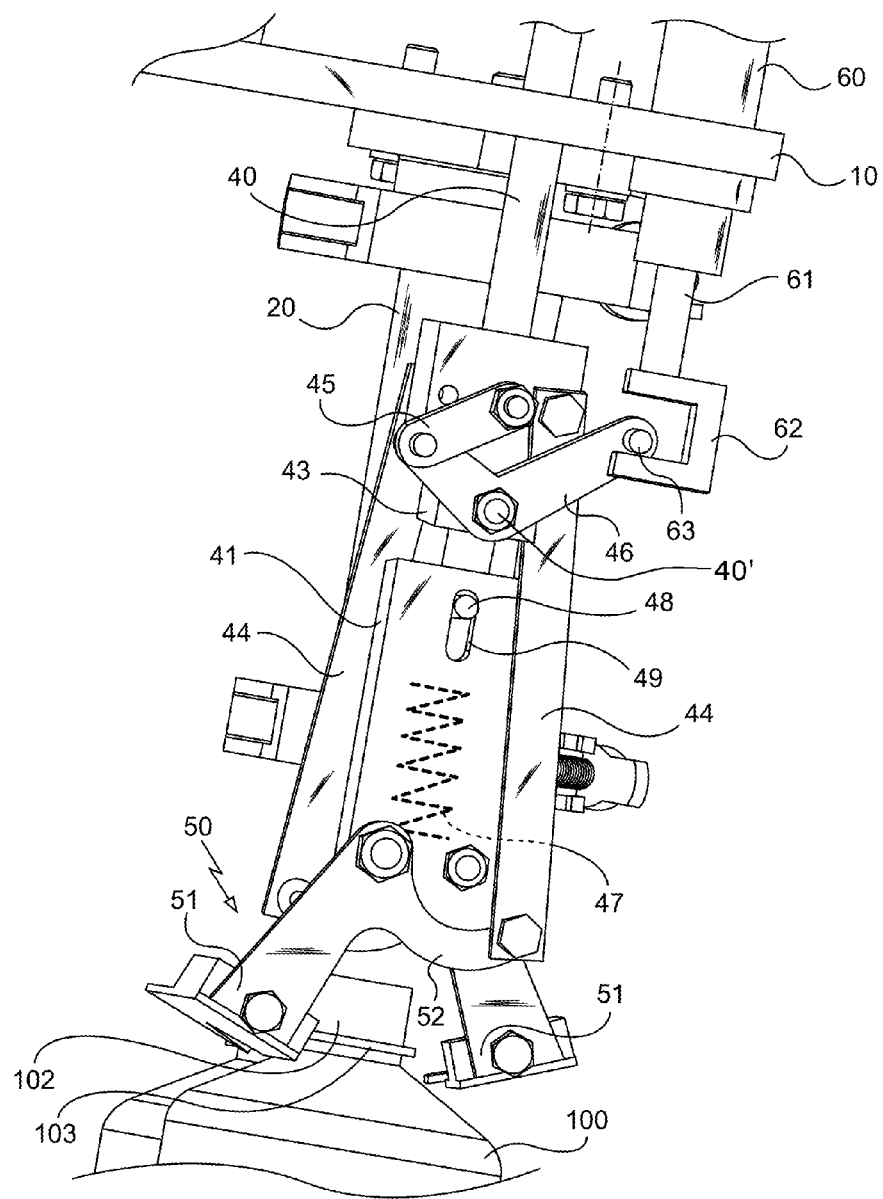
FIG. 7 is a fragmentary view in perspective of the installation, after the filled container has been put back.

When the links of the toggle 45 are in alignment, maximum lifting has been reached, but the telescopic rod 61 is extended so that the central hinge of the toggle 45 passes a little way beyond this alignment position. The spring 47 continues to push the first slider 41 downwards and thus brings the central hinge into abutment in extension and the lug 63 then loses contact with the hook 62 (see FIGS. 4 to 6). There is then no parasitic contact between the assembly suspended from the bar 31 and the remainder of the installation.

Filling of the lifted container 100 is then begun, and filling is interrupted when the weight measured by the metering device 30 reaches the desired value.

Retracting the telescopic rod 61 enables the toggle 45 to be "broken" so as to fold the toggle in order to bring the grasper member into the low position, thereby putting the container 100 back onto the conveyor 1, and then opening the jaws 52 and releasing the container 100.

In this example, the conveyor 1 is stopped during filling, so filling is thus performed in batches of containers, with each batch having a number of containers corresponding to the number of dispenser spouts mounted on the support 10.

Naturally, the invention is not limited to the embodiments described but covers any variant coming within the ambit of the invention as defined by the claims.

In particular, the installation may have a structure different from the structure described.

The conveyor may comprise a single segment or a plurality of segments arranged end to end.

The conveyor may also have a sliding surface on which the containers 100 stand via their bottoms 101 and on which they are moved, e.g. by means of a chain having container thrust members.

The support 10 may be movable relative to the conveyor 1. The support 10 may be a transporter arranged to move synchronously with the conveyor 1. Such movement may be continuous movement along a closed path, or it may be reciprocating movement, for example a walking-beam conveyor.

The invention also provides the use of a linear actuator mounted on the column for moving the grasper member between the low position and the high position.

In a variant, the guide may be telescopic and it may form an actuator that moves the grasper member while replacing the column.

In a variant, the grasper member may be arranged to grip the body of the container (as opposed to its neck) or to take hold of a handle of the container.

The means for synchronizing the movements of the jaws with the movement of the grasper member between its low and high positions may be other than the links 14 and the levers 52, for example they may comprise electric actuators controlled in synchronized manner by a control unit (such as an application specific integrated circuit (ASIC) for example).

The invention claimed is:

1. An installation for filling containers (100), the installation comprising a linearly-movable conveyor (1) on which the containers are to stand via their bottoms, and a support (10) extending at least in part over the conveyor, the support carrying at least one vertically-extending dispenser spout (20) and a weighing device (30) having suspended therefrom a vertical guide (40) extending in the vicinity of the dispenser spout, a container grasper member (50) being mounted on the vertical guide under the dispenser spout so that the grasper member is vertically movable between a low position in which the grasper member can grasp a container standing on the conveyor or can put a grasped container back onto the conveyor, and a high position in which the grasper member keeps the container separated from the conveyor and its opening close to the dispenser spout, and means for controlling the grasper member.

2. An installation according to claim 1, wherein the grasper member (50) is carried by a first slider (41) mounted to slide along the vertical guide (40) between a bottom abutment (43) fastened to the free bottom end of the support in order to define the low position of the grasper member, and a position corresponding to the high position of the grasper member.

3. An installation according to claim 2, wherein the grasper member (50) comprises two jaws (51) movable between open and closed positions and the installation includes means for synchronizing the movements of the jaws with the movement of the grasper member between its low and high positions.

4. An installation according to claim 3, wherein the first slider (41) is connected to a second slider (42) by at least one link (44) and the control means comprise a toggle (45) having a first end hinged to the second slider and a second end hinged to a stationary point (40') extending between the sliders in such a manner that the toggle is folded when the grasper member (50) is in the low position and is locked when the grasper member is in the high position, the second end of the toggle being extended by a control lever (46) for controlling the toggle, the control lever having a free end arranged to cooperate with vertical play with an actuator (60).

5. An installation according to claim 4, wherein two jaws (51) are mounted on the second slider (42) so as to be movable between the open and closed positions, the link (44) having one end hinged to at least one of the control leavers (46) secured to one of the jaws.

6. An installation according to claim 2, including a return member (47) urging the first slider (41) to bear against the bottom abutment (43).

7. An installation according to claim 1, wherein the weighing device (30) comprises a deformable bar (31) provided with a strain gauge, the vertical guide (40) being suspended from one end of the deformable bar.

8. An installation for filling containers (100), the installation comprising a linearly-movable conveyor (1) on which the containers are to stand via their bottoms, and a support (10) extending at least in part over the conveyor, the support carrying at least one vertically-extending dispenser spout (20) and a weighing device (30) having suspended therefrom a vertical guide (40) extending in the vicinity of the dispenser spout, a container grasper member (50) being mounted on the vertical guide to present an opening of a container under the dispenser spout and to be movable between a low position in which the grasper member can grasp a container standing on the conveyor or can put a grasped container back onto the conveyor, and a high position in which the container is separated from the conveyor and its opening is close to the dispenser spout, and means for controlling the grasper member, wherein the grasper member (50) is secured to a first slider (41) mounted to slide along the vertical guide (40) between a bottom abutment (43) fastened to the free bottom end of the vertical guide (40) in order to define the low position of the grasper member, and a position corresponding to the high position of the grasper member, the first slider (41) being connected to a second slider (42) by at least one link (44) and the control means comprising a toggle (45) having a first end hinged to the second slider and a second end hinged to a stationary point (40') extending between the sliders in such a manner that the toggle is folded when the grasper member (50) is in the low position and is locked when the grasper member is in the high position, the second end of the toggle being extended by a control lever (46) for controlling the toggle, the control lever having a free end arranged to cooperate with vertical play with an actuator (60), and wherein the grasper member (50) comprises two jaws (51) mounted on the second slider (42) so as to be movable between open and closed positions, the link (44) having one end hinged to at least one of the control leavers (46) secured to one of the jaws.

* * * * *